(12) United States Patent
Sugimoto et al.

(10) Patent No.: US 7,506,913 B2
(45) Date of Patent: Mar. 24, 2009

(54) BED COVERING APPARATUS

(75) Inventors: Ryuji Sugimoto, Niiza (JP); Takashi Iwasaki, Niiza (JP)

(73) Assignee: Honda Access Corporation, Niiza-shi (JP)

(*) Notice: Subject to any disclaimer, the term of this patent is extended or adjusted under 35 U.S.C. 154(b) by 416 days.

(21) Appl. No.: 11/350,015

(22) Filed: Feb. 9, 2006

(65) Prior Publication Data

US 2006/0186691 A1    Aug. 24, 2006

(30) Foreign Application Priority Data

Feb. 18, 2005    (JP)    ............... 2005-042714

(51) Int. Cl.
    B60P 7/02    (2006.01)
(52) U.S. Cl. ............... 296/100.02; 296/100.07; 296/100.06
(58) Field of Classification Search ............ 296/100.02, 296/100.01, 100.04, 100.06, 100.07, 136.01, 296/136.03
    See application file for complete search history.

(56) References Cited

U.S. PATENT DOCUMENTS

| | | | | | |
|---|---|---|---|---|---|
| 3,012,814 | A | * | 12/1961 | Penner | 296/100.07 |
| 3,489,456 | A | * | 1/1970 | Klanke | 296/100.07 |
| 3,762,762 | A | * | 10/1973 | Beveridge et al. | 296/100.07 |
| 3,923,334 | A | * | 12/1975 | Key | 296/100.07 |
| 4,079,989 | A | * | 3/1978 | Robertson | 296/100.07 |
| 4,083,596 | A | * | 4/1978 | Robertson | 296/100.1 |
| 4,124,247 | A | * | 11/1978 | Penner | 296/100.07 |
| 4,294,484 | A | * | 10/1981 | Robertson | 296/156 |
| 4,418,954 | A | * | 12/1983 | Buckley | 296/100.09 |
| 4,522,440 | A | * | 6/1985 | Gostomski | 296/100.07 |
| 5,183,309 | A | * | 2/1993 | Jordan | 296/100.07 |
| 5,251,951 | A | * | 10/1993 | Wheatley | 296/100.15 |
| 5,636,893 | A | * | 6/1997 | Wheatley et al. | 296/100.07 |
| 5,688,017 | A | * | 11/1997 | Bennett | 296/100.17 |
| 5,857,729 | A | * | 1/1999 | Bogard | 296/100.09 |
| 5,882,058 | A | * | 3/1999 | Karrer | 296/100.01 |
| 5,971,469 | A | * | 10/1999 | Lund et al. | 296/100.01 |
| 6,076,881 | A | * | 6/2000 | Tucker | 296/100.07 |
| 6,109,681 | A | * | 8/2000 | Edwards et al. | 296/100.02 |
| 6,170,900 | B1 | * | 1/2001 | Kooiker | 296/107.09 |
| 6,186,576 | B1 | * | 2/2001 | Kepley et al. | 296/100.06 |
| 6,203,086 | B1 | * | 3/2001 | Dirks et al. | 296/100.07 |
| 6,234,560 | B1 | * | 5/2001 | Hunt | 296/100.11 |
| 6,264,266 | B1 | * | 7/2001 | Rusu et al. | 296/100.07 |
| 6,299,232 | B1 | * | 10/2001 | Davis | 296/100.07 |
| 6,322,128 | B1 | * | 11/2001 | Karrer | 296/100.06 |
| 6,338,520 | B2 | * | 1/2002 | Rusu et al. | 296/100.07 |

(Continued)

FOREIGN PATENT DOCUMENTS

JP    64-56281    3/1989

*Primary Examiner*—Kiran B. Patel
(74) *Attorney, Agent, or Firm*—Westerman, Hattori, Daniels & Adrian, LLP.

(57) ABSTRACT

A vehicle has a bed and a tailgate openably and closably formed at the rear end of the vehicle. The exterior of the bed is surrounded by side panels. Elongated support members are provided on the inner wall of the side panel. A cover member which covers the bed is placed on the support members. The cover member has lock means for fixing the cover member to the bed. The lock means comprises a first fixation member which fixes the cover member to the bed in a disengageable manner, and a second fixation member which fixes the tailgate to the cover member in a disengageable manner.

12 Claims, 11 Drawing Sheets

U.S. PATENT DOCUMENTS

| | | | |
|---|---|---|---|
| 6,340,194 B1 * | 1/2002 | Muirhead et al. | 296/100.06 |
| 6,382,699 B1 * | 5/2002 | Hanson | 296/100.09 |
| 6,382,700 B2 * | 5/2002 | Young et al. | 296/100.1 |
| 6,427,500 B1 * | 8/2002 | Weinerman et al. | 296/100.07 |
| 6,447,045 B1 * | 9/2002 | Dickson et al. | 296/100.08 |
| 6,497,445 B1 * | 12/2002 | Combs, II | 296/100.07 |
| 6,520,558 B1 * | 2/2003 | Katterloher et al. | 296/100.06 |
| 6,565,141 B1 * | 5/2003 | Steffens et al. | 296/100.07 |
| 6,572,174 B2 * | 6/2003 | Hernandez et al. | 296/100.09 |
| 6,588,825 B1 * | 7/2003 | Wheatley | 296/100.01 |
| 6,588,826 B1 * | 7/2003 | Muirhead | 296/100.06 |
| 6,616,210 B1 * | 9/2003 | Massey | 296/100.1 |
| 6,641,200 B2 * | 11/2003 | Rusu | 296/100.07 |
| 6,641,201 B1 * | 11/2003 | Pietryga et al. | 296/100.1 |
| 6,702,360 B1 * | 3/2004 | Santos et al. | 296/100.07 |
| 6,742,832 B1 * | 6/2004 | Miskech et al. | 296/183.1 |
| 6,764,125 B2 * | 7/2004 | Bacon | 296/100.08 |
| 6,783,169 B1 * | 8/2004 | Marx et al. | 296/100.09 |
| 6,883,855 B2 * | 4/2005 | Chverchko et al. | 296/100.09 |
| 6,896,313 B2 * | 5/2005 | Mack et al. | 296/100.08 |
| 6,908,139 B1 * | 6/2005 | Szieff | 296/100.03 |
| 7,040,675 B1 * | 5/2006 | Ott et al. | 292/216 |
| 7,052,071 B2 * | 5/2006 | Mulder et al. | 296/100.07 |
| 7,083,218 B2 * | 8/2006 | Henderson | 296/100.06 |
| 7,188,888 B2 * | 3/2007 | Wheatley et al. | 296/100.04 |
| 7,252,322 B2 * | 8/2007 | Rusu | 296/100.07 |
| 7,258,387 B2 * | 8/2007 | Weldy | 296/100.07 |
| 7,261,328 B2 * | 8/2007 | Minix | 296/100.07 |
| 7,264,297 B2 * | 9/2007 | Boulard et al. | 296/100.1 |
| 7,316,445 B2 * | 1/2008 | Sugimoto | 296/100.03 |
| 7,322,633 B2 * | 1/2008 | Zajicek et al. | 296/100.06 |
| 2002/0063438 A1 * | 5/2002 | Rusu | 296/100.07 |
| 2005/0029832 A1 * | 2/2005 | Verduci et al. | 296/100.06 |
| 2005/0264024 A1 * | 12/2005 | Mulder et al. | 296/100.07 |
| 2006/0108826 A1 * | 5/2006 | McClure et al. | 296/100.07 |
| 2006/0208525 A1 * | 9/2006 | Jonsson | 296/100.02 |
| 2007/0063529 A1 * | 3/2007 | Weldy | 296/100.07 |
| 2007/0170739 A1 * | 7/2007 | Sims | 296/26.11 |

* cited by examiner

BED COVERING APPARATUS

BACKGROUND OF THE INVENTION

1. Field of the Invention

The present invention relates to a bed covering apparatus that is for use for a vehicle including a bed provided at the rear of the vehicle and having an open upper portion and a tailgate openably and closably provided at the bed, and includes a cover member which covers the bed and is detachably provided on the bed.

2. Description of the Related Art

Japanese Unexamined Patent Publication No. 64-56281 discloses a conventional cover for covering a bed of a pickup truck with side walls, a front end and a rear end. The cover comprises a plurality of cover panels, a rear cover panel which extends across the side walls for covering a truck bed area adjacent to the rear end of the truck bed, and a second cover panel for covering the area of the rear end. The rear panel has a forwardly projecting channel-shaped hinge portion. A rearwardly projecting hinge portion of the second panel and the forwardly projecting hinge portion of the rear panel are so interlocked as to provide a hinged connection between those panels. A fixation mechanism for each panel to detachably and selectively fix the cover panels to the side walls of the truck bed is provided. Accordingly, when one of the cover panels is fixed to a predetermined position over the bed of the truck, the other panels can pivot around the hinged connection and be opened to expose the bed area of the truck below the other covers. The cover further comprises a fixation mechanism which fixes the panels to the side walls of the truck.

The conventional cover is for the pickup truck with the fixation mechanism provided on the rear end thereof. To prevent theft, the cover is closed before placements of the cover panels, and closes the bed as the cover panels are fixed by engagement of the fixation mechanisms of the individual cover panels with the side walls. Accordingly, for a pickup truck which does not have a fixation mechanism at the rear end thereof, the rear end is not fixed by just fixing the cover panels, so that it is difficult to take measures for theft.

The invention has been made in view of the above-described circumstance, and it is an object of the invention to provide a bed covering apparatus which locks the bed of a truck even if the truck does not have fixation means.

SUMMARY OF THE INVENTION

To achieve the object, according to the first aspect of the invention, a bed covering apparatus for use for a vehicle including a bed provided at a rear of the vehicle and having an open upper portion and a tailgate openably and closably provided at the bed, comprises a cover member which covers the bed and is detachably provided thereon, a first fixation member which fixes the cover member to the bed in a disengageable manner, and a second fixation member which fixes the tailgate to the cover member in a disengageable manner.

A hinge member which renders the tailgate openable and closable may be provided at one side of the tailgate, and the second fixation member may be provided opposite to the hinge member.

The second fixation member may comprise a female member and a male member, which is provided on a bottom side of the cover member and comprises an engagement member and a male-bracket urging member which presses the engagement member against the cover member.

The second fixation member may comprise a male member and a female member comprising a female bracket and a female-bracket urging member which stops the female bracket raised.

The female bracket may be formed in such way that the female bracket obliquely inclines toward a leading end of the female bracket in a folded state and the leading end contacts an inner wall surface of the tailgate.

The engagement member may be engaged with the female bracket by a lock apparatus which is fixedly provided at the cover member.

According to the invention, as the first fixation member fixes the cover member to the bed in a disengageable manner and the second fixation member fixes the tailgate in a disengageable manner, the cover member is fixed to the bed, and the tailgate is also fixed. Therefore, even if the vehicle does not have fixation means, the bed of the vehicle is locked.

BRIEF DESCRIPTION OF THE DRAWINGS

The object, other objects, and advantages of the invention will be more apparent upon reading the following detailed description together with the accompanying drawings in which.

DETAILED DESCRIPTION OF THE PREFERRED EMBODIMENT

A preferred embodiment of the invention will be explained with reference to the accompanying drawings.

Figure 1:
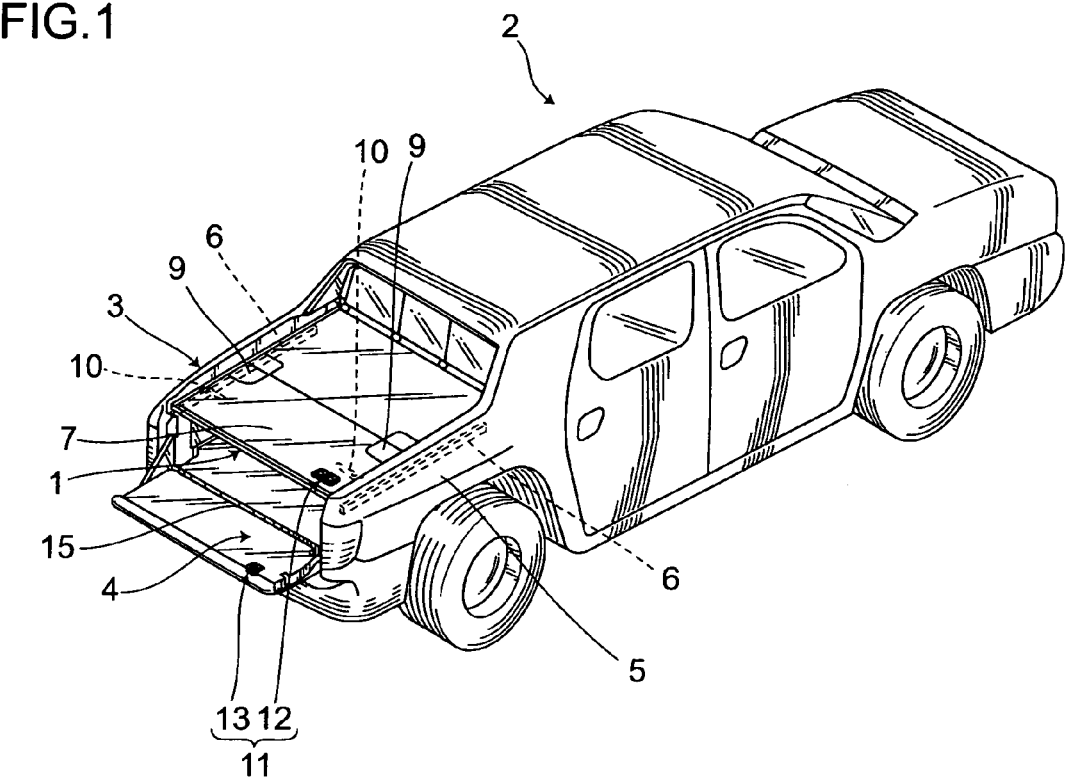
FIG. 1 is a perspective view illustrating a vehicle with a tailgate opened down according to the invention.

A bed covering apparatus 1 illustrated in FIG. 1 is used for a vehicle 2 comprising a bed 3, which is provided at the rear of the vehicle 2 and has an open upper portion, and a tailgate 4 openably and closably provided at the bed 3.

The exterior of the bed 3 is surrounded by side panels 5. Elongated support members 6 are provided on the inner wall of the side panel 5. The bed covering apparatus 1 is placed on the support members 6.

The bed covering apparatus 1 comprises the cover member 7 which covers the bed 3, and lock means which fixes the cover member 7 to the bed 3.

The cover member 7 is a rectangular plate-like member separated into a plurality of portions, and is structured in such a manner as to be higeably rotated upwardly by a rotational support member 9 provided at the approximate center of the cover member 7. The lock means comprises a first fixation member 10 which fixes the cover member 7 to the bed 3 in a disengageable manner, and a second fixation member 11 fixes the tailgate 4 to the cover member 7 in a disengageable manner. The first fixation member 10 is provided at the rear and both side ends of the cover member 7. The second fixation member 11 comprises a male member 12 provided on the cover member 7, and a female member 13 provided on the tailgate 4. The male member 12 and the female member 13 are provided in a manner disengageable from each other.

Figure 2:
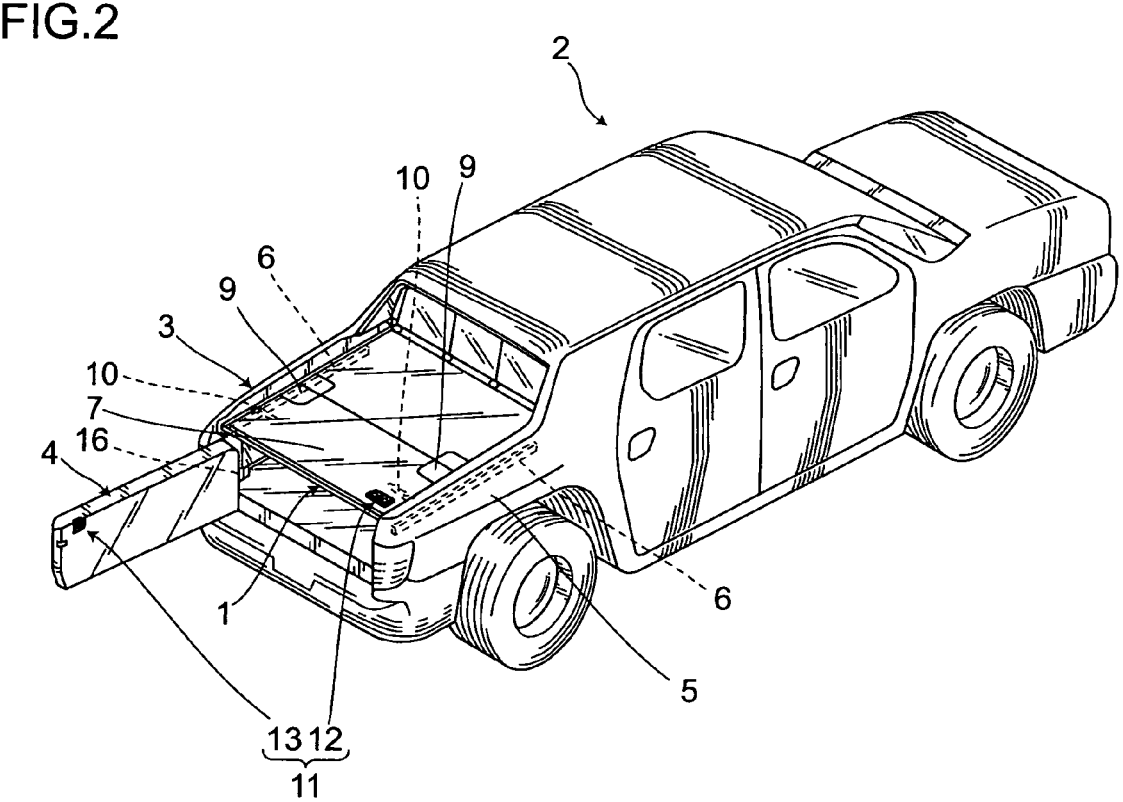
FIG. 2 is a perspective view illustrating the vehicle with the tailgate opened sideway according to the invention.

Provided at the bottom end of the tailgate 4 is a first axial support member 15 which ensures downward opening of the tailgate 4 for releasing the tailgate 4 backwardly. As illustrated in FIG. 2, provided at one lateral side of the tailgate 4 is a second axial support member 16 which ensures sideway opening of the tailgate 4 for releasing the tailgate 4 either rightward OF leftward. The second fixation member 11 is provided opposite to the second axial support member 16, i.e., provided at the other lateral side where the second axial support member 11 is not provided.

Figure 3:
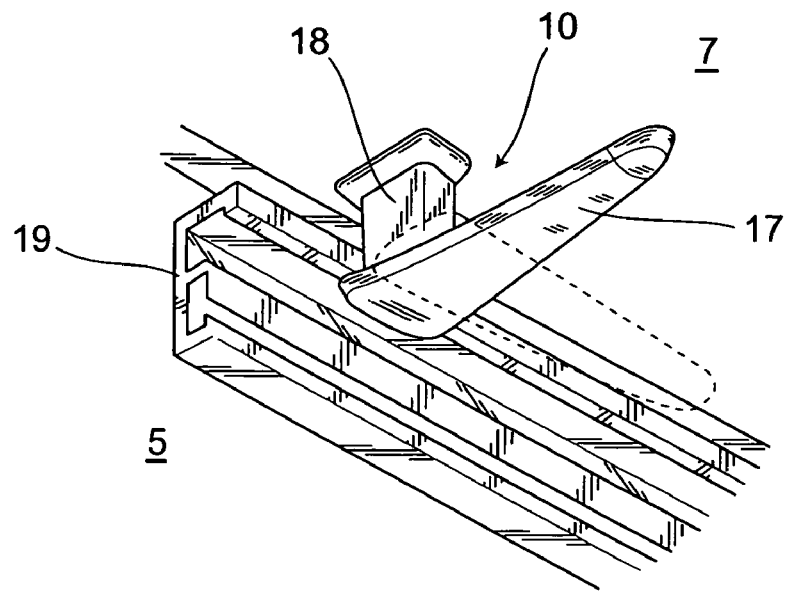
FIG. 3 is a perspective view illustrating a first fixation member provided on a vehicular cover member according to the invention.

FIG. 3 is a perspective view illustrating the first fixation member 10. The first fixation member 10 comprises a lever 17, and an axial-support fixation portion 18 which rotatably fixes the lever 17 to the bottom side of the cover member 7. A bedrail 19 is provided on the inner wall of the side panel 5 of the bed 3.

Figure 4:
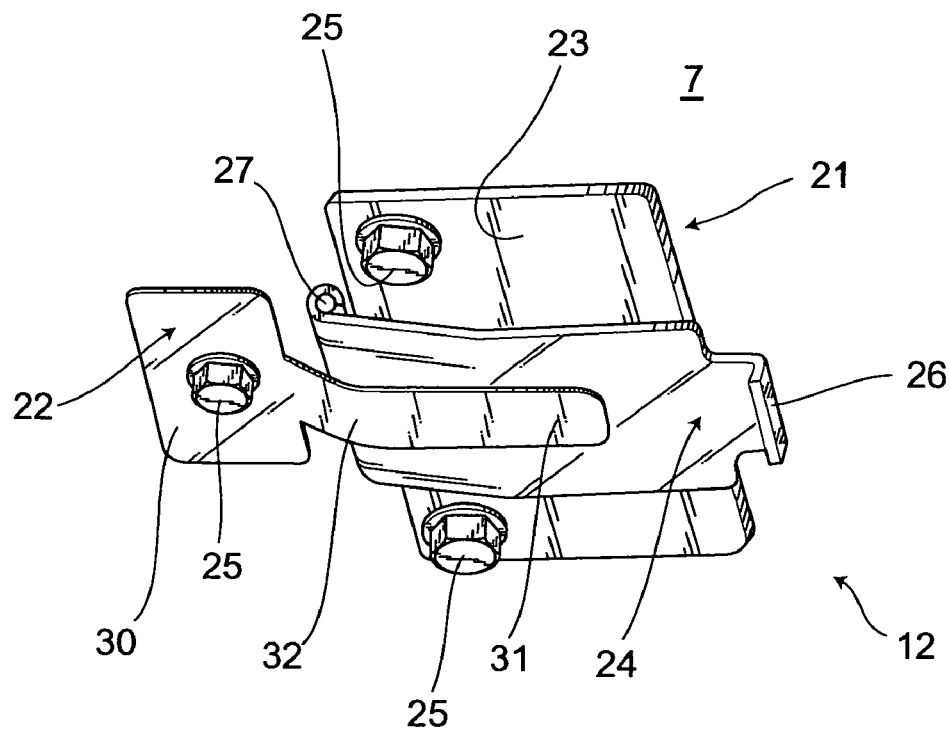
FIG. 4 is a perspective view illustrating a male member of a second fixation member of the invention provided at a bed of the vehicle.

FIG. 4 is a perspective view illustrating a male member 12 which constitutes the second fixation member 11. The male member 12 comprises an engagement member 21 and a male-bracket urging member 22. The engagement member 21 comprises a first base bracket 23, and a male bracket 24.

The first base bracket 23 is a rectangular plate member fixed to the bottom side of the cover member 7 by bolts 25. The male bracket 24 has an engagement portion 26 at the leading end thereof, and is rotatably linked with the first base bracket 23 at the base end by a first hinge 27. The engagement member 26 is so formed as to protrude downwardly.

The male-bracket urging member 22 is a T-shaped plate-like member whose base end is provided with a base portion 30 fixed to the bottom side of the cover member 7 by a bolt 25, behind the engagement member 21. The male-bracket urging member 22 further has an urging piece 31 on the leading end thereof, and an urging portion 32 which urges the urging piece 31 upwardly. The male-bracket urging member 22 has a vertically long rectangular member extending obliquely downward from the approximate center of the base portion 30 which is a horizontally long rectangular member. The urging member 32 formed in a gradual arcuate shape is provided at the male-bracket urging member 22. The linear urging piece 31 is integrally formed at the tip of the urging member 32.

Figure 5:
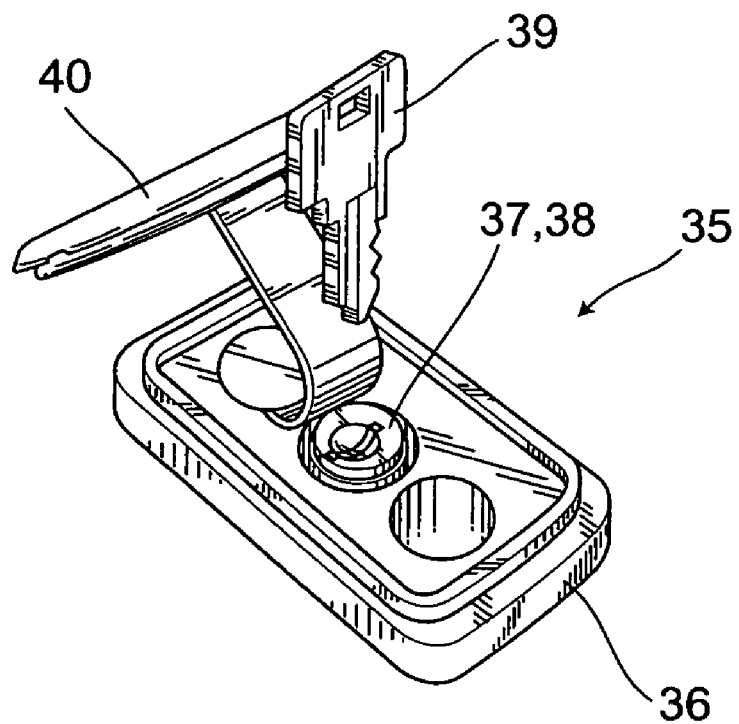
FIG. 5 is a perspective view illustrating a lock apparatus of the invention provided on the vehicular cover member.
Figure 6:
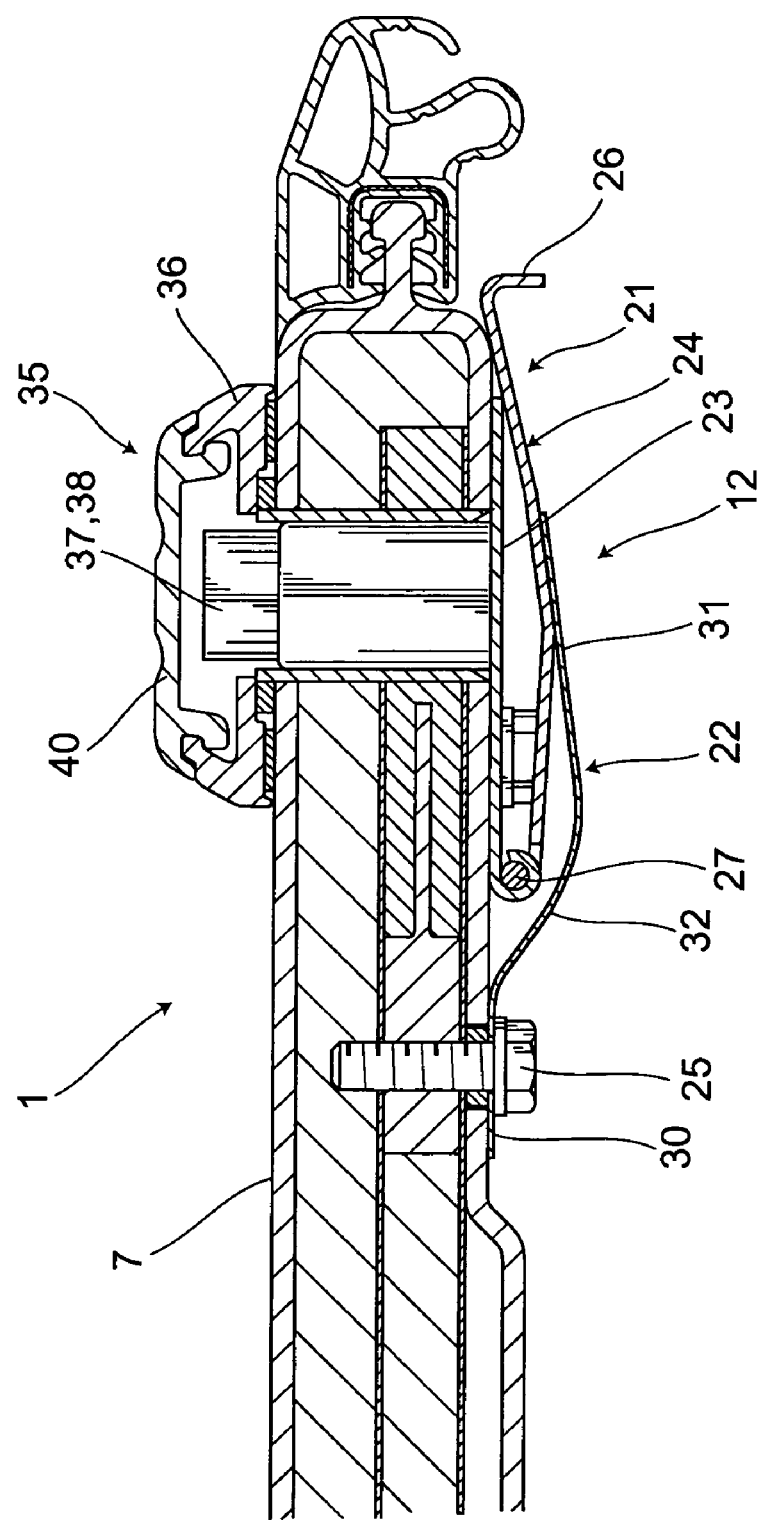
FIG. 6 is a longitudinal cross-sectional view of the vehicular cover member of the invention.

FIG. 5 is a perspective view illustrating a lock apparatus 35. The lock apparatus 35 comprises a key box 36, a push-type key cylinder 37 provided in the key box 36, an internal cylinder 38 which is provided in the key cylinder 37 and is slidable upwardly and downwardly, a key 39 which pushes out or pushes in the internal cylinder 38, and a lid 40 which covers the lock apparatus 35 from the above, and engages with the key box 36. The lock apparatus 35 structured in this manner is placed above the male member 12, and fixedly provided at the cover member 7.

Figure 7:
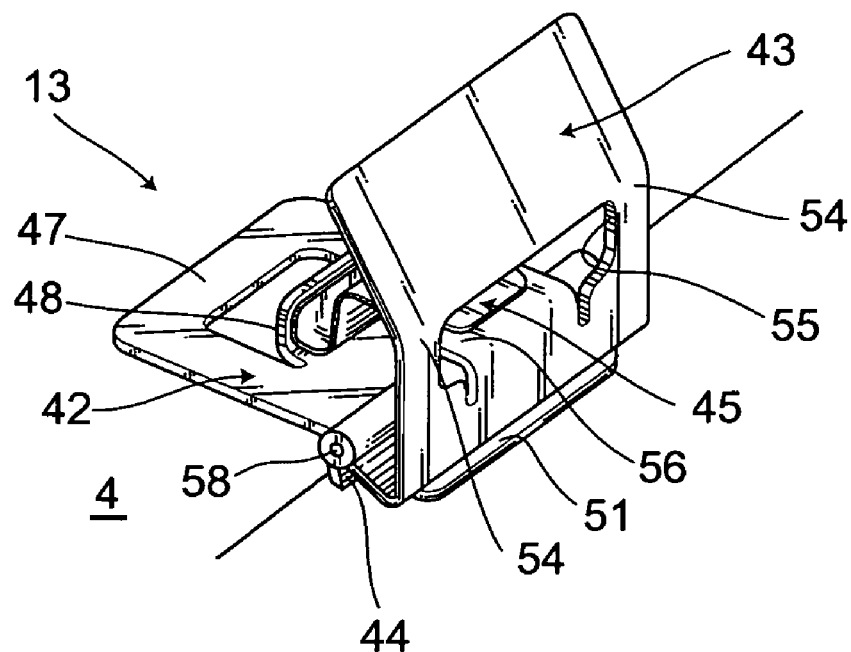
FIG. 7 is a perspective view illustrating a female member of the second fixation member, provided at the bed of the vehicle, in a use state.

FIG. 7 is a perspective view illustrating the female member 13 constituting the second fixation member 11. The female member 13 comprises a second base bracket 42, a female bracket 43, a fixation member 44, and a female-bracket urging member 45.

Figure 8:
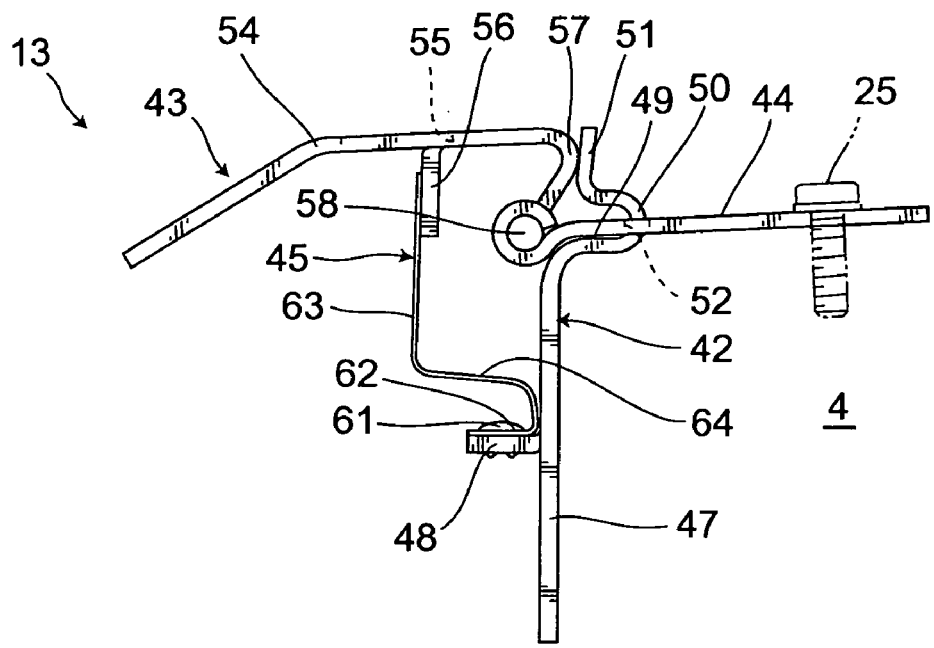
FIGS. 8(a) and 8(b) are side views of the female member of the second fixation member of the invention provided at the bed of the vehicle, respectively illustrating the female member in the use state, and the female member in a non-use state.
Figure 8:
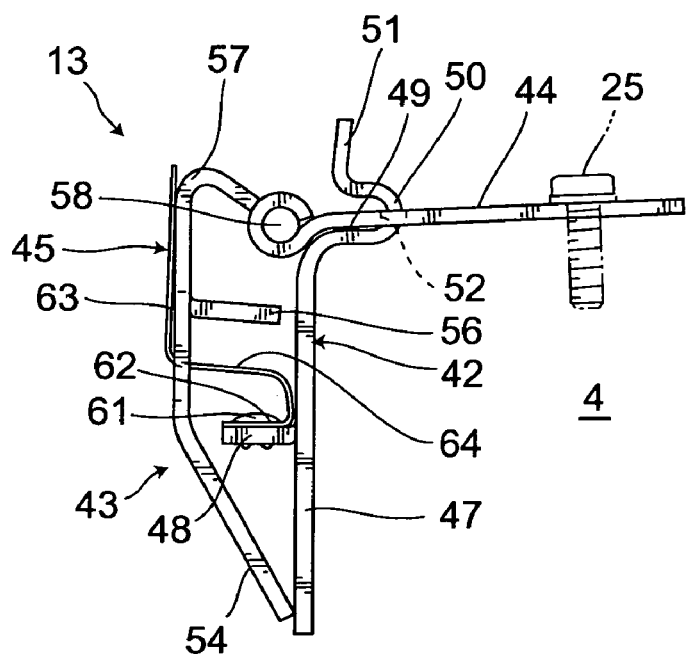

FIGS. 8(a) and 8(b) are side views of the female member 13, respectively illustrating the female member 13 in a use state, and in a non-use state. The second base bracket 42 comprises a base 47 which extends along the inner wall of the tailgate 4, a fixation portion 48 formed by vertically cutting and raising the approximate center of the base 47, an abut portion 49 formed by orthogonally bending the base 47, a bent portion 50 to be held by the tailgate 4, and an upright portion 51 provided approximately in parallel to the base 47 in a standing manner.

The fixation member 44 comprises a plate-like member. The leading end of the fixation member 44 is fixed to the tailgate 4 by a bolt 25, and the base end of the fixation member 44 is provided with a through hole 52 in which the second base bracket 42 is inserted.

The female bracket 43 is an approximately rectangular plate-like member, and comprises a finger catching portion 54 formed by obliquely bending the leading end portion of the female bracket 43, thereby creating space, a receiving portion 55 formed at the approximate center of the plate-like member, a stopper portion 56 formed by cutting a portion and vertically raising this portion, and a rear end portion 57 formed in an arcuate shape on the base end side of the female bracket 43. The base end of the female bracket 43 is rotatably linked with the fixation member 44 by a second hinge 58.

The female-bracket urging member 45 is a plate-like elastic member whose cross section has an approximately S-like shape. The base end of the female-bracket urging member 45 has a bottom portion 62 which is fixed to the fixation portion 48, provided at the second base bracket 42, by a rivet 61 or the like. The female-bracket urging member 45 further comprises an elastic piece 63, and an elastic member 64 which urges the elastic piece 63 toward the top surface of the stopper portion 56. The female-bracket urging member 45 is formed upright approximately perpendicularly from the fixation member 62, and the elastic member 64 is formed in an S-like shape. The elastic piece 63 is linearly formed at the tip of the elastic member 64, and slightly inclines toward the second hinge 58.

Next, the above-described structure will be explained with reference to the drawings.

First, an explanation will be given of a case where the cover member 7 is fixed to the bed 3 by the first fixation member 10. As illustrated in FIG. 1, the cover member 7 is placed on the support members 6 provided at the side panels 5 of the bed 3. After the placement of the cover member 7 on the support members 6, as illustrated in FIG. 3, the lever 17 of the first fixation member 10 provided at the bottom side of the cover member 7 is turned to make the leading end of the lever 17 engaged with the bedrail 19. As the leading end of the lever 17 is engaged with the bedrail 19, the cover member 7 is fixed to the side panels 5 of the bed 3.

Next, an explanation will be given of a case where the tailgate 4 is fixed to the bed 3 by the second fixation member 11.

Figure 9:
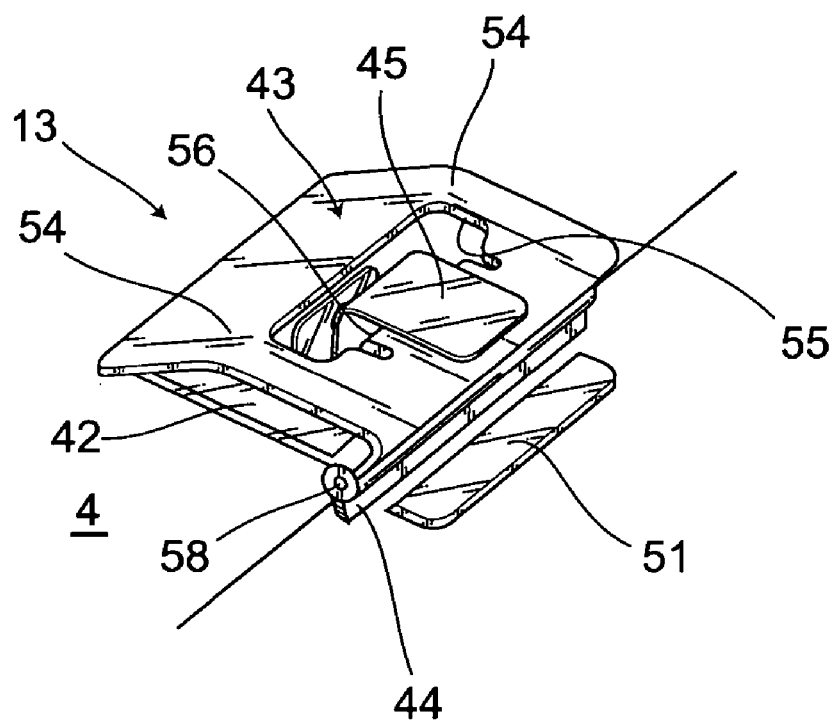
FIG. 9 is a perspective view illustrating the female member of the second fixation member of the invention, provided at the bed of the vehicle, in a folded state.

First, as illustrated in FIG. 9, the female bracket 43 in a folded state is set in a non-use state. That is, regarding the female member 13 which constitutes the second fixation member 11 provided at the tailgate 4, the finger catching portion 54 of the female bracket 43 is lifted upwardly. This causes the female bracket 43 to rotate around the second hinge 58 and be pulled out. As the female bracket 43 is pulled out, the stopper portion 56 formed at the female bracket 43 abuts on the urging piece 63 provided at the female-bracket urging member 45 fixed to the second base bracket 42, as illustrated in FIG. 8(a). Further, pulling out the female bracket 43 permits the rear end portion 57, formed at the base end side of the female bracket 43, to abut on the upright portion 51, so that the rotation of the female bracket 43 is stopped. As the base end abuts on the upright portion 51, the female bracket 43 is fixed with the receiving portion 55, formed at the center of the female bracket 43, being open in the approximately vertical direction. As the urging piece 63 provided at the female-bracket urging member 45 and the stopper portion 56 have a surface contact with each other and the urging piece 63 is pressed against the stopper portion 56, friction occurs at the contact surfaces, thereby preventing the female bracket 43 from falling down. Further, because the fixation member 44 is fixed to the tailgate 4 by the bolt 25 and the second base bracket 42 is fixed to the abut portion 49 by the fixation member 44, it is possible to prevent the female member 13 from being disengaged from the tailgate 4 (FIG. 8(b)) even if a baggage is caught on the female bracket 43 when the baggage is pulled out from the bed 3. As illustrated in FIG. 9, when the female bracket 43 is not in use, the female bracket 43 is folded approximately in parallel to the top surface of the tailgate 4, making it possible to prevent the interference of the female bracket 43 at the time of loading or unloading the baggage with respect to the bed 3. Because the female bracket 43 is structured in such a way that the female bracket 43 obliquely inclines toward the leading end in the folded state and the leading end contacts the inner wall surface of the tailgate 4, a baggage can be placed on the female bracket 43 when the baggage is pulled out from the bed 3. This ensures smooth pull-out of the baggage without damaging the baggage.

Figure 10:
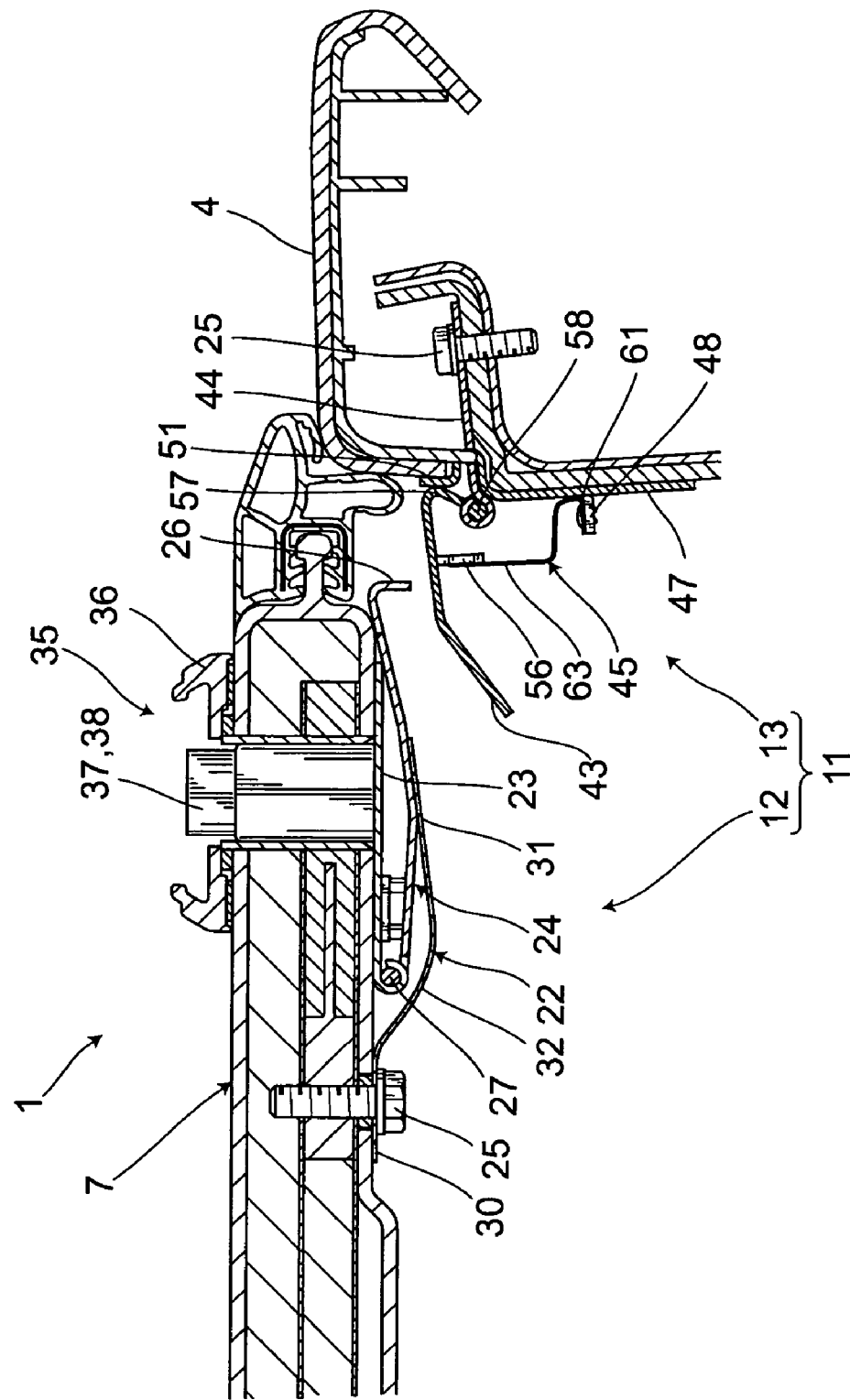
FIG. 10 is a side view illustrating the female member of the second fixation member of the invention, provided at the bed of the vehicle, before locking.
Figure 11:
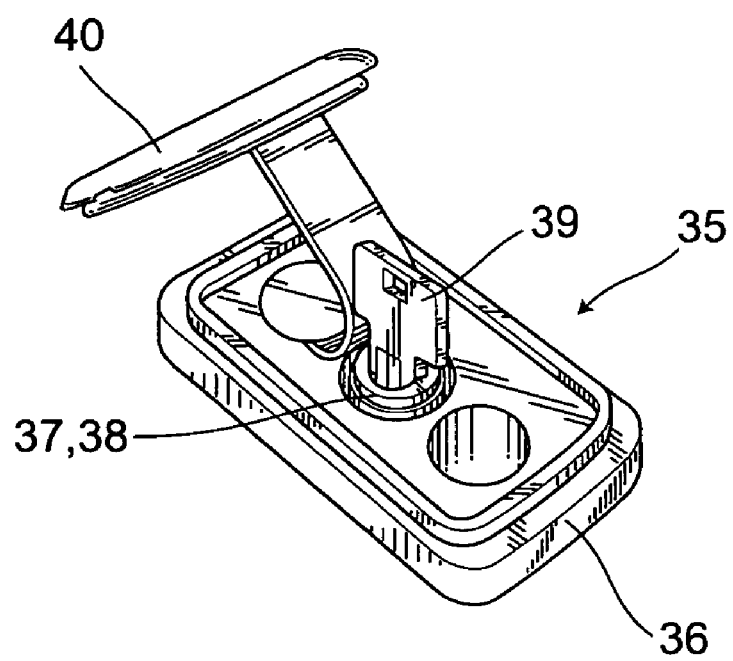
FIG. 11 is a perspective view illustrating the lock apparatus, provided on the vehicular cover member of the invention, in a locked state.
Figure 12:
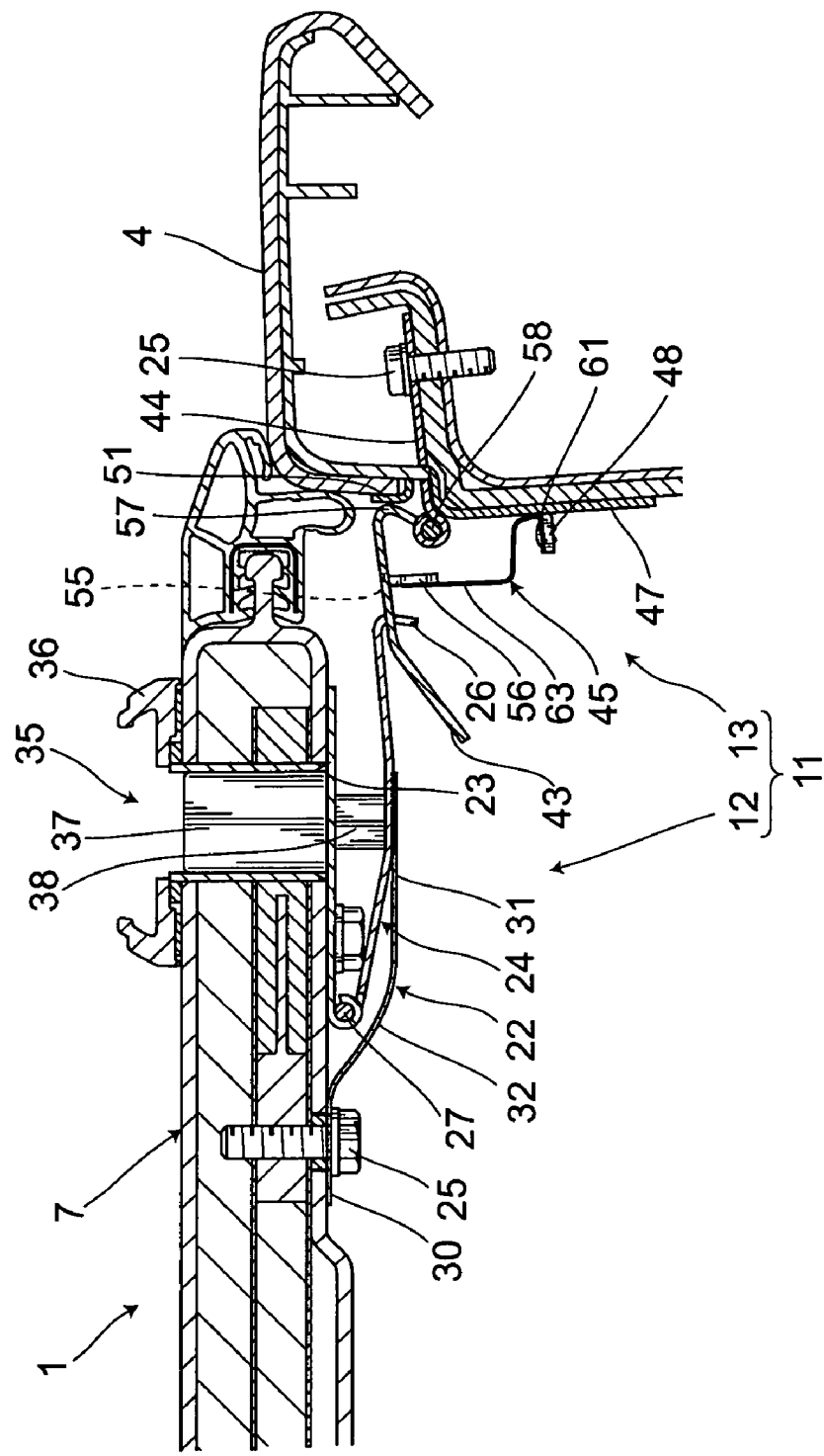
FIG. 12 is a side view illustrating the female member of the second fixation member of the invention, provided at the bed of the vehicle, after locking.

Next, as illustrated in FIG. 10, the tailgate 4 is closed with the female bracket 43 standing upright. After the tailgate 4 is closed with the female bracket 43 standing upright, as illustrated in FIG. 11, the key 39 is inserted into the key cylinder 37, causing the internal cylinder 38 to protrude. The protruded internal cylinder 38 abuts on the male bracket 24 as illustrated in FIG. 12, and pushes down the male bracket 24 against the male-bracket urging member 22. This causes the downwardly protruding engagement member 26, formed at the leading end of the male bracket 24, to engage with the receiving portion 55 which is formed at the female bracket 43. Accordingly, the second fixation member 11 fixes the tailgate 4 to the cover member 7.

As explained above, even if the tailgate 4 does not have lock means independently fixed to the side panels 5 of the bed 3, the bed 3 can surely be locked by fixing the cover member 7 to the bed 3 by the first fixation member 10 and fixing the tailgate 4 to the cover member 7 by the second fixation member 11.

Figure 13:
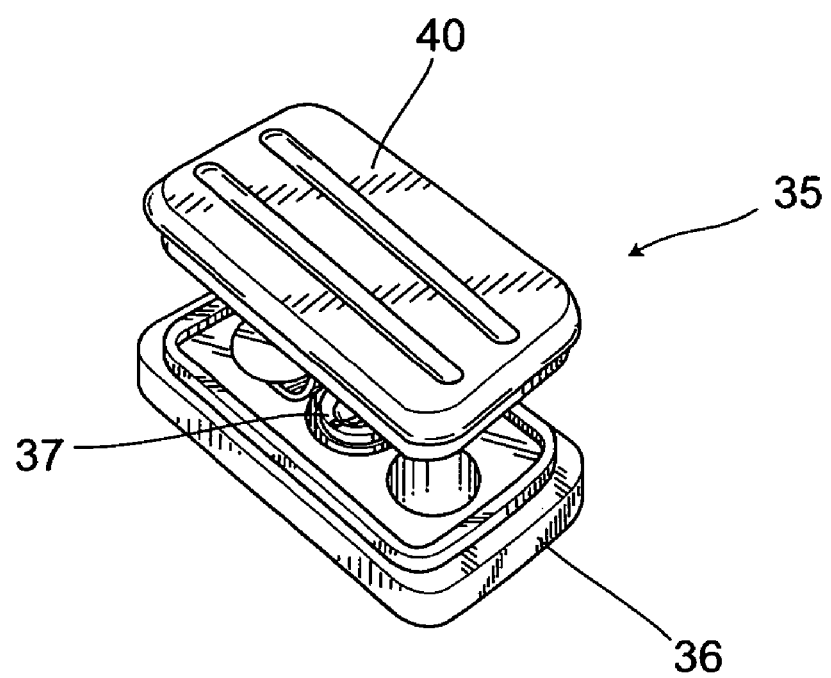
FIG. 13 is a perspective view illustrating the lock apparatus, provided on the vehicular cover member of the invention, with a lid being to be closed.

Further, as illustrated in FIG. 13, the key 39 is pulled out from the key cylinder 37 of the lock apparatus 35, and the lid 40 is placed on the lock apparatus 35. This ensures waterproofing of the key cylinder 37, and prevention of a problem caused by introduction of a foreign material.

As explained above, when not in use, the male bracket 24 is held upwardly by the male-bracket urging member 22, i.e.,held abutting on the bottom side of the cover member 7, the male member 12 does not prevent pulling in and out of the baggage with the bed 3 being covered by the cover member 7. Because the male bracket 24 is pressed against the cover member 7 by the urging member 32, and integrated with the cover member 7, the cover member 7 can be bent upwardly by the rotational support member 9. Further, the second fixation member 44 is provided at the other side where the second axial support member 16 is not provided, thereby ensuring locking both in the downward opening and sideway opening of the tailgate 4.

As explained above, according to the invention, the bed covering apparatus 1 that is for use for the vehicle 2 including the bed 3 provided at the rear of the vehicle 2 and having the open upper portion and the tailgate 4 openably and closably provided at the bed 3, comprises the cover member 7 which covers the bed 3 and is detachably provided on the bed 3, the first fixation member 10 which fixes the cover member 7 to the bed 3 in a disengageable manner, and the second fixation member 11 which fixes the tailgate 4 to the cover member 7 in a disengageable manner. Therefore, the cover member 7 is locked to the bed 3, and the tailgate 4 is locked. This ensures locking of the bed 3 of the vehicle 2 which does not have fixation means at the tailgate 4.

The second axial support member 16, which makes the tailgate 4 openable and closable, is provided at one side of the tailgate 4, and the second fixation member 11 is provided opposite to the second axial support member 16. Because the second fixation member 11 is located apart from the second axial support member 16, the load acting on the second fixation member 11 can be reduced. This allows miniaturization of the second fixation member 11, and ensures locking without breaking the second fixation member 11.

The invention is not limited to the embodiment, and can be modified in various forms within the scope of the invention.

What is claimed is:

1. A bed covering apparatus for use for a vehicle including a bed provided at a rear of said vehicle and having an open upper portion and a tailgate openably and closably provided at said bed, comprising:
   a cover member which covers said bed and is detachably provided thereon;
   a first fixation member which fixes said cover member to said bed in a disengageable manner; and
   a second fixation member which fixes said tailgate to said cover member in a disengageable manner,
   wherein said second fixation member comprises a male member and a female member comprising a female bracket and a female-bracket urging member which retains said female bracket in a raised position.

2. The bed covering apparatus according to claim 1, wherein a hinge member which renders said tailgate openable and closable is provided at one side of said tailgate, and said second fixation member is provided opposite to said hinge member.

3. The bed covering apparatus according to claim 1, wherein said male member is provided on a bottom side of said cover member and comprises an engagement member and a male-bracket urging member which presses said engagement member against said cover member.

4. The bed covering apparatus according to claim 2, wherein said male member is provided on a bottom side of said cover member and comprises an engagement member and a male-bracket urging member which presses said engagement member against said cover member.

5. The bed covering apparatus according to claim 1, wherein said female bracket obliquely inclines toward a leading end of thereof, and wherein said leading end of said female bracket contacts an inner wall surface of said tailgate in a folded state.

6. The bed covering apparatus according to claim 2, wherein said female bracket obliquely inclines toward a leading end of thereof, and wherein said leading end of said female bracket contacts an inner wall surface of said tailgate in a folded state.

7. The bed covering apparatus according to claim 3, wherein said female bracket obliquely inclines toward a leading end of thereof, and wherein said leading end of said female bracket contacts an inner wall surface of said tailgate in a folded state.

8. The bed covering apparatus according to claim 4, wherein said female bracket obliquely inclines toward a leading end of thereof, and wherein said leading end of said female bracket contacts an inner wall surface of said tailgate in a folded state.

9. The bed covering apparatus according to claim 3, wherein said engagement member is engaged with said female bracket by a lock apparatus which is fixedly provided at said cover member.

10. The bed covering apparatus according to claim 4, wherein said engagement member is engaged with said female bracket by a lock apparatus which is fixedly provided at said cover member.

11. The bed covering apparatus according to claim 7, wherein said engagement member is engaged with said female bracket by a lock apparatus which is fixedly provided at said cover member.

12. The bed covering apparatus according to claim 8, wherein said engagement member is engaged with said female bracket by a lock apparatus which is fixedly provided at said cover member.

* * * * *